July 23, 1957  E. E. WEINGAND  2,799,952
SNOW HOE
Filed Oct. 28, 1953
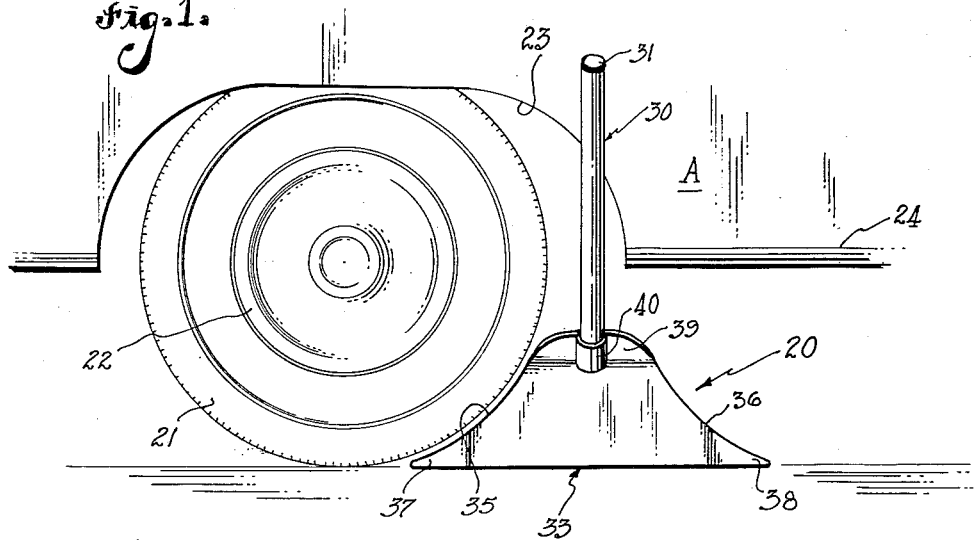
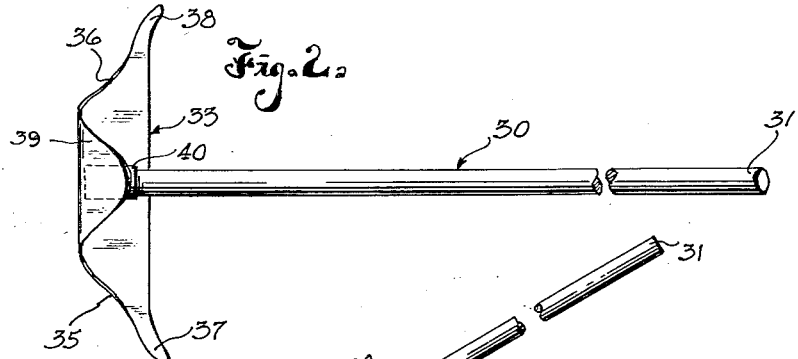
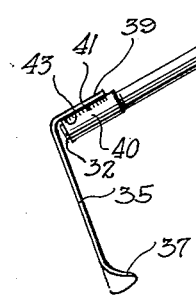
INVENTOR.
Edward E. Weingand
BY Joseph M. Gartner
ATTY.

United States Patent Office 2,799,952
Patented July 23, 1957

2,799,952
SNOW HOE

Edward E. Weingand, Forest Park, Ill.

Application October 28, 1953, Serial No. 388,708

1 Claim. (Cl. 37—53)

This invention relates, in general, to hoes, and is more particularly concerned with a snow hoe adapted for convenient and advantageous employment in effecting removal of snow disposed adjacent the wheels of an automotive vehicle.

Otherwise stated, the invention is embodied in a snow hoe particularly designed, formed and of a shape for convenient access to snow disposed immediately adjacent the wheels of an automotive vehicle, the now hoe being compact for easy stowage in the automotive vehicle trunk or behind the driver's seat.

Heretofore, when snow struck, the motorist usually employed a shovel or such other means as conveniently available to him for removing the snow disposed adjacent the wheels of the vehicle. However, the employment of shovels and the like for this purpose has been proven inconvenient and difficulties are usually encountered in obtaining access to the snow disposed immediately adjacent the wheels of the vehicle.

Accordingly, an important object and accomplishment of the invention is to provide a snow hoe having a body provided with a handle securely affixed thereto, the side marginal edges of said body being curved and of a contour so that these marginal edges will fit closely to either side of the tire of the automotive vehicle and with the extreme tips thereof being bowed inward in order to effect movement of the snow toward the center of the body for effective removal of the snow immediately adjacent the wheels of the automotive vehicle.

An ancillary object and accomplishment of the invention is to provide a new and improved snow hoe which is adapted to be economically manufactured and which is so designed as to permit the manufacture and assembly thereof in accordance with present day large scale mass production methods of construction and assembly.

The invention seeks as a final object and accomplishment to provide a snow hoe particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as more fully described herein, and as more particularly pointed out in the appended claim.

Embodiments of the inventions are illustrated in the accompanying drawings forming a part hereof and wherein:

Fig. 1 is a front elevational view of the snow hoe embodying the features of the present invention, the snow hoe being shown in its operative position immediately adjacent to the wheels of an automotive vehicle;

Fig. 2 is a top plan view of the snow hoe depicted in Fig. 1; and

Fig. 3 is a side elevational view of the snow hoe depicted in Fig. 1.

The drawings are to be understood to be more or less of a schematic character for the purpose of illustrating and disclosing a preferred form of the improvements contemplated herein and in the drawings like reference characters identify the same parts in the several views.

Attention is invited to Fig. 1 wherein there is disclosed the snow hoe with which the present invention is particularly concerned and designated in its entirety by the numeral 20 as being employed in effecting removal of snow (not shown) disposed immediately adjacent the tire 21 mounted on a wheel 22 of an automotive vehicle designated in its entirety by the Letter A and which may have a fender 23 forming a part of the vehicle body 24.

Suffice it to say, since the invention is not particularly concerned with the precise construction of the automotive vehicle A and/or its component parts as shown, they will not be further described in detail, and it is deemed sufficient for all intentions and purposes herein contained to show only portions thereof cooperating with the elements contemplated by this invention.

Having thus described the general environment surrounding the invention contemplated herein, the snow hoe with which this invention is particularly concerned will now be described in detail.

In the exemplary embodiment of the invention depicted in Figs. 1, 2 and 3, the snow hoe 20 with which the invention is particularly concerned comprises, in general, a handle 30 having a free end 31 and the other end 32 of which is secured to a hoe body 33 formed of metal as shown.

The hoe body 33 is of unitary construction and preferably is formed of a single piece of metal with the side marginal edges respectively indicated at 35 and 36 being curved and contoured to fit either side of the automotive tire as indicated at 21. The extreme outer portions respectively indicated at 37 and 38 are bowed inward so as to effect movement of the snow adjacent the central regions of the body whereby the snow may be removed by manual force applied to the handle 30 by the user. The upper regions of the body 33 are formed to provide a bent ledge 39, the under side of which has fixedly secured thereto a metallic tubular shaped member 40 adapted to accommodate the end portions 32 of the handle 30. The tubular shaped member 40 may be welded as at 41 or otherwise secured to the under side 43 of the ledge 39.

While it is preferred to manufacture the snow hoe body 33 of metal, the invention contemplates the possibility of forming the body 33 of a plastic or of a composition having similar characteristics. If the snow hoe is formed of metal, it may be painted in an attractive color appealing to the aesthetic senses of the user, and if the body is formed of a plastic it may be desirable to select an appropriate color.

It is notable that the snow hoe contemplated by the present invention is convenient in size, and is particularly adapted for stowage in the automotive vehicle trunk or behind the driver's seat. It is suggested that a relatively short handle approximately 4 feet long may advantageously be employed.

In operation, the snow hoe may be employed as shown in Fig. 1 in order to remove snow disposed immediately adjacent the tire 21 of the automotive vehicle A. Because of the particular contour and design of the marginal edges as at 35 and 36 and the extreme outer edges as at 37 and 38, these portions of the snow hoe fit closely to the contour of the tire 21 and, therefore, will effectively remove the snow disposed immediately adjacent the tire 21. Because each side of the snow hoe body 33 has the curved marginal edges as at 35 and 36, the snow hoe 20 is contoured to fit either side of each tire of the automotive vehicle. Moreover, the inward bow shape of the extreme outer edges as at 37 and 38 will direct the snow toward the central regions of the snow hoe body 33 for more effective removal of the snow responsive to manual force being exerted via the handle 30.

Because of its simple construction, the snow hoe 20 contemplated herein is economical to manufacture and is readily adaptable to mass production manufacturing methods.

From the foregoing disclosure, it may be observed that I have provided a snow hoe which efficiently fulfills the objects as hereinbefore set forth and which provides numerous advantages which may be summarized as follows:

1. Structurally simple, efficient and durable;
2. Economical to manufacture and readily adaptable to mass production manufacturing principles; and
3. The provision of a snow hoe particularly designed, formed and of a shape for convenient access to snow disposed immediately adjacent the wheels of an automotive vehicle, the snow hoe being compact for easy stowage in the automotive vehicle trunk or behind the driver's seat.

While I have illustrated a preferred embodiment of my invention, many modifications may be made without departing from the spirit of the invention, and I do not wish to be limited to the precise details of construction set forth, but wish to avail myself of all changes within the scope of the appended claim.

I claim:

A snow hoe adapted for employment in removing snow disposed immediately adjacent an automative vehicle tire, comprising a main centrally disposed generally flat body portion, flanking side marginal edge portions having curved marginal contours complementary to the circular contour of a vehicle wheel, said hoe having a bottom ground engaging edge, said contoured portions merging with flanking bottom terminal edge portions, said edge portions being particularly characterized by being substantially complementary in shape to the shape defined by a wheel tread and a supporting surface for said tread, said flanking bottom terminal edge portions being particularly characterized by being curved or bowed inwardly in the normal direction in which said hoe is operated, whereby to increase the effectiveness of the hoe in moving the snow to be engaged thereby in the direction of the central flat region of said body and whereby to give added strength to said flanking bottom terminal edge portions.

References Cited in the file of this patent

UNITED STATES PATENTS

| | | |
|---|---|---|
| 403,655 | Gates | May 21, 1889 |
| 612,002 | Jenkins | Oct. 4, 1898 |
| 1,595,821 | Buffington | Aug. 10, 1926 |